United States Patent
O'Rorke et al.

(10) Patent No.: US 11,771,999 B2
(45) Date of Patent: Oct. 3, 2023

(54) PERSONALIZED GAME NOTIFICATIONS

(71) Applicant: Valve Corporation, Bellevue, WA (US)

(72) Inventors: John O'Rorke, Kirkland, WA (US); Dennis Geels, Kirkland, WA (US); Adil Sardar, Renton, WA (US); Alden Kroll, Seattle, WA (US)

(73) Assignee: Valve Corporation, Bellevue, WA (US)

( * ) Notice: Subject to any disclaimer, the term of this patent is extended or adjusted under 35 U.S.C. 154(b) by 0 days.

(21) Appl. No.: 16/826,111

(22) Filed: Mar. 20, 2020

(65) Prior Publication Data

US 2021/0291059 A1 Sep. 23, 2021

(51) Int. Cl.
*A63F 13/79* (2014.01)
*A63F 13/533* (2014.01)

(52) U.S. Cl.
CPC ............ *A63F 13/79* (2014.09); *A63F 13/533* (2014.09)

(58) Field of Classification Search
CPC ......... A63F 13/79; A63F 13/533; A63F 13/61
See application file for complete search history.

(56) References Cited

U.S. PATENT DOCUMENTS

| | | | | |
|---|---|---|---|---|
| 8,298,087 B1* | 10/2012 | Smith | ................ | G06Q 30/0255 705/26.7 |
| 9,662,566 B1* | 5/2017 | Chyou | .................. | A63F 13/795 |
| 9,778,737 B1* | 10/2017 | Strand | ..................... | G06F 3/017 |
| 9,878,240 B2* | 1/2018 | Gault | ................. | H04N 21/4781 |
| 9,895,611 B2* | 2/2018 | Webb | ...................... | A63F 13/85 |
| 9,922,456 B2* | 3/2018 | Forster | .................... | G06T 19/20 |
| 10,791,370 B1* | 9/2020 | Viswanathan | ...... | A63F 13/5375 |
| 11,038,974 B1* | 6/2021 | Koukoumidis | ..... | G06F 16/3329 |
| 2007/0077979 A1* | 4/2007 | Cohn | .................. | G07F 17/3244 463/16 |
| 2007/0156589 A1* | 7/2007 | Zimler | ................... | H04H 60/72 705/51 |
| 2011/0055733 A1* | 3/2011 | Hamilton, II | .......... | A63F 13/79 715/757 |
| 2011/0055919 A1* | 3/2011 | Hamilton, II | ....... | A63F 13/5372 715/757 |
| 2012/0225723 A1* | 9/2012 | Webster | ................ | A63F 13/798 463/43 |

(Continued)

OTHER PUBLICATIONS

Erik Johnson, "A Deep Dive Into Steam's Discovery Queue", Apr. 4, 2019, Gamasutra (Year: 2019).*

(Continued)

*Primary Examiner* — Chase E Leichliter
(74) *Attorney, Agent, or Firm* — Lee & Hayes, P.C.

(57) ABSTRACT

Described herein are, among other things, techniques, devices, and systems for generating personalized game-notification feeds for users. In some instances, a remote computing system that offers one or more games for acquisition may determine which notifications generated by respective game publishers are likely to be of interest to different users and, after doing so, may generate personalized game-notification feeds comprising the selected notifications. Further, each of the users may provide feedback regarding one or more of the notifications in the notification feed, which the system may use to re-select notifications and re-generating personalized game-notification feeds.

19 Claims, 4 Drawing Sheets

(56) References Cited

U.S. PATENT DOCUMENTS

| | | | | |
|---|---|---|---|---|
| 2013/0065665 | A1* | 3/2013 | Watkins | G07F 17/32 463/20 |
| 2013/0079142 | A1* | 3/2013 | Kruglick | G06Q 30/02 463/43 |
| 2013/0331179 | A1* | 12/2013 | Taylor | A63F 13/795 463/29 |
| 2013/0339111 | A1* | 12/2013 | Ross | G06F 3/0481 463/31 |
| 2013/0346234 | A1* | 12/2013 | Hendrick | G06Q 30/0631 705/26.7 |
| 2014/0080560 | A1* | 3/2014 | Knutsson | A63F 13/822 463/10 |
| 2014/0221069 | A1* | 8/2014 | Kessman | G07F 17/3241 463/13 |
| 2014/0235338 | A1* | 8/2014 | Hansson | A63F 13/533 463/31 |
| 2014/0258309 | A1* | 9/2014 | Young | G06F 16/95 707/748 |
| 2014/0274354 | A1* | 9/2014 | George | G06Q 30/0631 463/29 |
| 2014/0274355 | A1* | 9/2014 | George | G06Q 30/0631 463/29 |
| 2014/0279121 | A1* | 9/2014 | George | G06Q 30/0283 705/26.1 |
| 2014/0351744 | A1* | 11/2014 | Jeon | H04M 1/72448 715/781 |
| 2015/0141114 | A1* | 5/2015 | Davis | G07F 17/34 463/20 |
| 2015/0256884 | A1* | 9/2015 | Eaton | H04N 21/6334 725/14 |
| 2015/0350146 | A1* | 12/2015 | Cary | H04L 51/24 709/206 |
| 2015/0370456 | A1* | 12/2015 | Kobayashi | A63F 13/23 463/32 |
| 2016/0092581 | A1 | 3/2016 | Joshi et al. | |
| 2016/0310843 | A1* | 10/2016 | Webb | A63F 13/497 |
| 2017/0340963 | A1* | 11/2017 | Bucher | A63F 13/40 |
| 2019/0270251 | A1* | 9/2019 | Nagai | A63F 13/85 |
| 2020/0005196 | A1* | 1/2020 | Cai | G06F 16/9535 |
| 2020/0053428 | A1 | 2/2020 | Seely et al. | |
| 2020/0155948 | A1* | 5/2020 | Eatedali | A63F 13/79 |
| 2020/0184992 | A1* | 6/2020 | Newell | G06N 5/046 |
| 2020/0312095 | A1* | 10/2020 | Kendall | G07F 17/34 |
| 2021/0243265 | A1* | 8/2021 | Hammond | G06Q 50/01 |

OTHER PUBLICATIONS

Gamer Zorata, "How to Discover your queue in Steam", Oct. 31, 2015, <youtube.com/watch?v=_SWKndeFyTk> (Year: 2015).*

PCT Search Report and Written Opinion dated Jun. 24, 2021 for PCT application No. PCT /US21/23143, 8 pages.

* cited by examiner

PERSONALIZED GAME NOTIFICATIONS

BACKGROUND

As the consumption of content items on electronic devices has continued to proliferate, so has the amount of available content items and information regarding these content items. For example, the number of songs, movies, television shows, and games available for streaming or download has increased substantially in the recent past. While this increase in available content items, and information about these content items, is generally beneficial to users, identifying content items and information of interest for individual users remains difficult.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 1 is a diagram illustrating an example environment that includes multiple client computing devices, operated by respective users, coupled to a remote computing system configured to provide games and other content items to the client computing devices. In addition, the remote computing system may generate a notification feed for each of the users, with each notification feed being personalized to a user based on game titles associated with the respective user, such as game titles owned by the user, game titles added to a list (e.g., a wish list of the user), game titles that the user follows, and/or the like.

DETAILED DESCRIPTION

Figure 1:
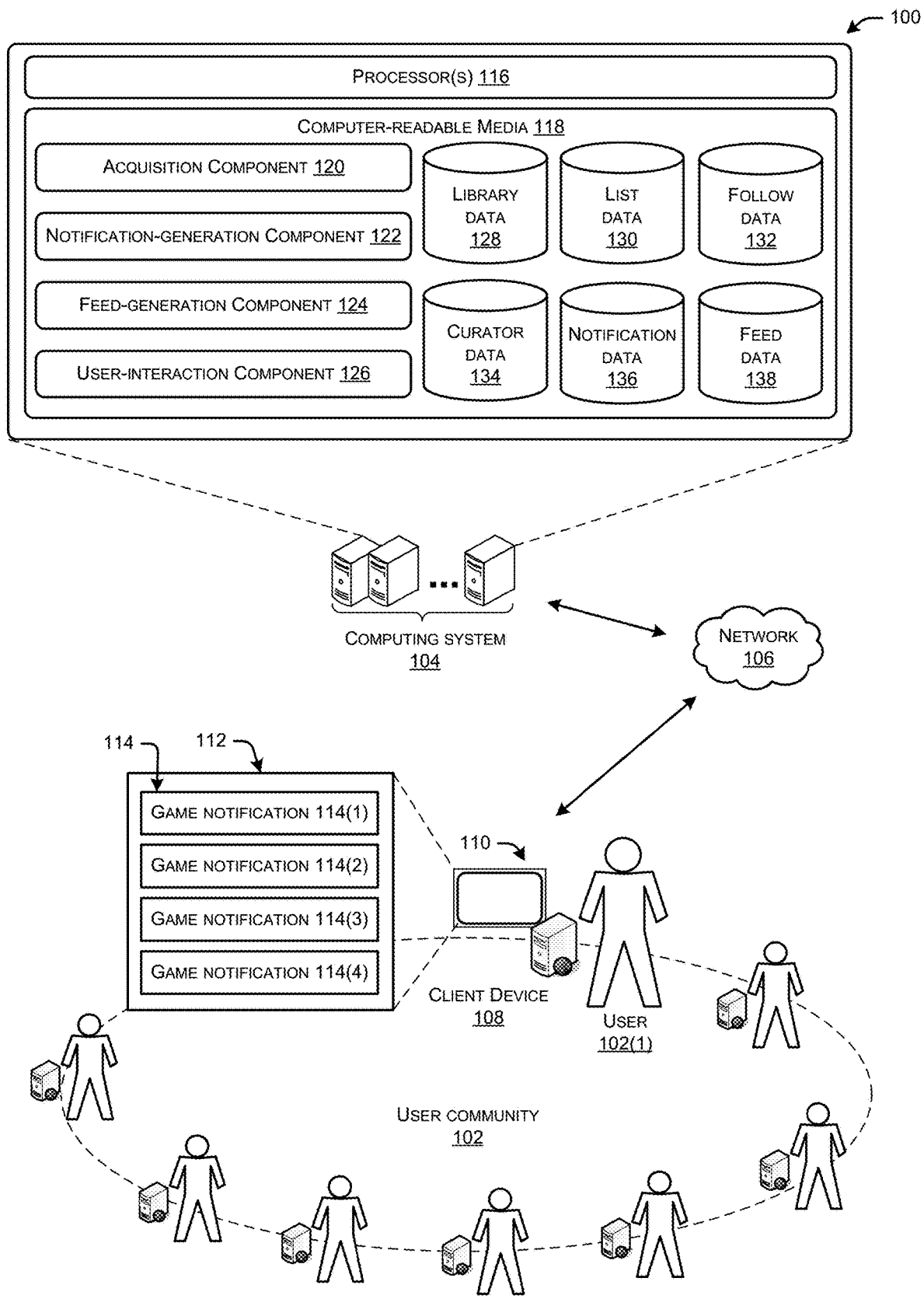

Described herein are, among other things, techniques, devices, and systems for generating personalized game-notification feeds for users. In some instances, a remote computing system that offers one or more game titles for acquisition may determine which notifications generated by respective game publishers are likely to be of interest to different users and, after doing so, may generate personalized game-notification feeds comprising the selected notifications. Further, each of the users may provide feedback regarding one or more of the notifications in the notification feed, which the system may use to re-select notifications and re-generate personalized game-notification feeds.

To generate a personalized notification feed associated with a user, the remote computing system may determine a set of game titles associated with the user. The set of game titles may include those games that the user has previously acquired (e.g., owns or has rented) or has played, games that the user has requested to follow, games that the remote computing system recommends for the user (e.g., because they are related to games previously played by the user), games that the user has added to a list of the user (e.g., a wish list of the user), games that have been recommended by game curators that the user follows, games that are currently trending or are at or near a top of sales or gameplay list (e.g., in general or in game categories associated with the user), and/or the like.

In some instances, the remote computing system may apply a weight to each respective game title included in the set of game titles. For example, the remote computing system may apply a time-decay model to each game title such that a game that a user has more recently played is weighted more heavily than a game that the user has not played for quite some time. In another example, a game that the user more recently purchased may be weighted more heavily than a game that the user purchased further back in time. In still another instance, a game that a user has followed more recently may be weighted more heavily than a game that the user followed longer ago. In yet another example, a weight may increase with the amount of time that the user has played a game, such that a heavily played game is weighted more heavily than a rarely played game. This may be determined either absolutely (e.g., in terms of time played) or relatively (e.g., in terms of time played relative to other users that have also played the game title or in terms of time played relative to the amount of time the same user has played other game titles). Of course, while the above describes an example manner of assigning weights to game titles, in other instances the weights may be applied in an opposite manner or in any other manner.

After determining the set of game titles associated with the user and, potentially, applying weights to these titles, the remote computing system may determine one or more notifications associated with these game titles to present to the user. In this regard, game publishers associated with particular games may generate notifications for presentation to users. These notifications may, at a high level, include any information associated with the respective games. For example, a notification may comprise any one or more of the following:

- an indication that a game update is available, such as a small update, a patch update, or a major update;
- an indication that additional game content is available, such as indication that a game is currently or about to be released, an indication of a future release date of the game, an invitation to participate in a beta version of the game or to learn about the beta version, an indication that downloadable (DLC) content has or will become available, or an indication of an upcoming season or battle pass release;
- an indication that a game discount or promotion is available, such as a limited-time discount on the game, a discount on in-game or DLC items, or a free trial associated with the game;

an indication of an in-game event, such as time period in which a user will receive extra points (an "XP boost"), loot drops, bonuses or perks being offered, or a general in-game event;

an indication of a game challenge or contest, such as a weekly or monthly challenge, a contest within a game, or the like;

an indication of a live stream or broadcast of a game;

an indication of a game announcement;

an indication of a communication session associated with a game, such as a chat session;

an indication of an in-person event associated with the game, such as an expo, meetup, or convention;

an indication of promotion of a related game (e.g., a cross-promotion); or an indication of other types of news associated with the game.

As noted above, the remote computing system may determine which notifications to present to a user based on the set of game titles associated with the user. For example, for each game indicated in the set of game titles, the remote computing system may identify one or more game notifications for the respective game provided by the respective game publisher. Given that the number of notifications associated with this set of game titles may be relatively large, the remote computing system may apply a score to each notification for ranking these notifications relative to one another. After ranking the notifications, the remote computing system may generate and present, to the user, a notification feed that is ordered or otherwise presented based at least in part on this ranking.

For example, the remote computing system may apply a score to each notification based, at least in part, on the weight applied to the respective game title. For instance, if a game title is associated with a relatively high weight because the user plays the game fairly often, then one or more notifications associated with this game title may be assigned a higher weight and, thus, score than a notification associated with a game that the user rarely plays.

In addition, or in the alternative, the score associated with each notification may be based, at least in part, on other information associated with the user or based on information associated with one or more other users. For example, if the particular user has previously indicated a desire for a certain type of event, such as an indication of a game update, then the remote computing system may rank these types of notifications higher than notifications that the user has not previously expressed interest in. In other instances, the remote computing system may assign a relatively higher score to notifications that users of a broader user community often utilize. For example, if many users of a particular game (or many users in general) often watch live-streamed events, then notifications of these events may be assigned a higher score than other types of notifications.

In some instances, the remote computing system determines the scores for respective notifications based on explicit or implicit feedback provided by a particular user and/or by users generally. For example, after providing a notification feed to a user, the remote computing system may determine which of the notifications the user interacts with (e.g., selects, watches, reads, etc.), as well as which notifications the user does not. In addition, the remote computing system may determine an amount of time that the user consumes each respective notification. In some instances, the ratio between a number of times a particular type of notification is selected to a number of times that the remote computing system presented the notification type to the user (i.e., click-to-impression ratio) may be used in part to determine a score for subsequent notifications of that type. For example, if a user often reads about game updates when they are presented to the user, this relatively high-ratio of selections to impressions may result in a relatively high score being assigned to subsequent game-update notifications. Conversely, if a user rarely selects a notification associated with a game promotion, then the remote computing system may assign relatively lower scores to notifications associated with game promotions.

This may additionally, or alternatively, apply on a game-by-game basis. That is, if the user often selects notifications associated with a first game, but rarely with a second game, then the remote computing system may assign a relatively high score to subsequent notifications associated with the first game (and, potentially, related games) and relatively lower scores to subsequent notifications associated with the second (and, potentially, related games). Further, while the above techniques have been described with reference to a particular user, the techniques may similarly or alternatively apply to a user community in general. That is, if users of a particular user community (e.g., a global community, a subset of the global community, etc.) often watch live-stream events when presented notifications about these events, then these types of notifications may be assigned a relatively high score for other users assigned in the community of the subset of the community.

After selecting the notifications to include in a personalized notification feed for a user, the remote computing system may generate the personalized notification feed comprising the selected notifications and may send the notification feed for output (e.g., display, audible output, etc.) on a client computing device associated with the user. The personalized notification feed may be presented in a manner based at least in part on the respective scores of the corresponding notifications. For example, a highest scored/ranked notification may be presented first, followed by a second-highest scored/ranked notification, and so forth. In addition, or in the alternative, the personalized game-notification feed may present higher-ranked notifications more prominently (e.g., in a larger manner) than lesser-ranked notifications. As described below, each notification in the notification feed may be selectable by the user to view additional information with the notification. For example, selection of a particular notification may result in an expansion of the notification to present additional content associated with the notification, navigation to a new user interface associated with the notification, and/or the like.

As noted above, as the user interacts with the notification feed, the remote computing system may use this feedback for re-calculating scores associated with the notifications for the user and, potentially, generating an additional personalized game-notification feed for the user. In addition, or in the alternative, the user may provide explicit feedback. For example, in some instances the notification feed includes one or more icons that are selectable by the user to provide the feedback. For example, each notification may include a first icon (e.g., a like button) that, when selected, indicates that the user would like to see more of these types of notifications and/or generally enjoys this particular notification. Additionally, or alternatively, each notification may include a second icon that is selectable by the user to indicate that the user would like to see fewer of these types of notifications and/or that the user does not enjoy this particular notification. Each notification may further include a third icon that, when selected, enables a user to comment on the notification. As with the first icon, selection of the third icon and the providing of a comment by the user may be received by the remote computing system as indicative of a positive response of the user.

In some instances, the remote computing system may use the received feedback to generate new scores and/or rankings and, thus, a new personalized notification feed in real-time or near-real-time. In other instances, the remote computing system may use the received feedback for generating a new personalized notification feed the next time that the user navigates to a location (e.g., webpage, portion of a client mobile application, etc.) on which the personalized notification feed is presented.

In some instances, the remote computing system may use the inputs described above, such as feedback of users, game-title sets, and the like, to train one or more machine-learning models for determining personalized notification feeds. For example, after such a model has been trained, the remote computing system may input data that is custom to a particular user such that the model outputs a ranked list of notifications for inclusion in the personalized notification feed.

The techniques introduced above are described with reference to FIGS. 1-4. The disclosed techniques may be implemented, at least in part, by a remote computing system that distributes content items (e.g., video games, movies, television shows, songs, etc.) and notification feeds to client devices of a user community (e.g., as part of a video-game service, movie service, song service, etc.). It is to be appreciated that while these techniques are described with reference to games (e.g., video games), these techniques may apply to any other type of content items, such as books, movies, videos, or the like.

FIG. 1 is a diagram illustrating an example environment 100 that includes multiple client computing devices, operated by respective users of a user community 102. As illustrated, each of the client computing devices may couple to a remote computing system 104 over a network 106. For example, FIG. 1 illustrates a user 102(1) operates a client computing device ("client device") 108, which couples to a display device 110. The user 102(1) may operate the client device 108 to interact with the remote computing system 104, which may provide games and other content items to the client computing device 108 and other client computing devices. In addition, the remote computing system 104 may generate a notification feed for each of the users, with each notification feed being personalized to a user based on game titles associated with the respective user, such as game titles owned by the user, game titles added to a list (e.g., a wish list of the user), game titles that the user follows, and/or the like. In addition, or in the alternative, the notification feed may include notifications generated by sources other than game publishers, such as notifications generated by game curators that users in the user community 102 follow (e.g., game reviews made by the curators), notifications generated by other users in the user community 102, and so forth. Further, in some instances, the presented notifications might not be based on games associated with the particular user, but rather may comprise trending notifications, notifications for top-selling games, or the like.

The client device 108 may be implemented as any suitable type of computing device configured to execute content items, such as video games, movies, songs, and/or the like. The client device 108 may comprise, without limitation, a personal computer (PC), a desktop computer, a laptop computer, a mobile phone (e.g., a smart phone), a tablet computer, a portable digital assistant (PDA), a wearable computer (e.g., virtual reality (VR) headset, augmented reality (AR) headset, smart glasses, etc.), an in-vehicle (e.g., in-car) computer, a television (smart television), a set-top-box (STB), a game console, a music player, a voice-controlled assistant, and/or any similar computing device. The client device 108 may communicate with the remote computing system 104 (sometimes shortened herein to "computing system 104") over the computer network 106. The computer network 106 may represent and/or include, without limitation, the Internet, other types of data and/or voice networks, a wired infrastructure (e.g., coaxial cable, fiber optic cable, etc.), a wireless infrastructure (e.g., radio frequencies (RF), cellular, satellite, etc.), and/or other connection technologies. The computing system 104 may, in some instances be part of a network-accessible computing platform that is maintained and accessible via the computer network 106. Network-accessible computing platforms such as this may be referred to using terms such as "on-demand computing", "software as a service (SaaS)", "platform computing", "network-accessible platform", "cloud services", "data centers", and so forth.

In some embodiments, the computing system 104 acts as, or has access to, a video game platform that implements a video game service to distribute (e.g., download, stream, etc.) video games (or any other type of content item) to the client devices, such as the client device 108. In an example, each client device may install a client application thereon. The installed client application may be a video-game client (e.g., gaming software to play video games). A client device 108 with an installed client application may be configured to download, stream, or otherwise receive programs (e.g., video games, and content thereof) from the computing system 104 over the computer network 106. Any type of content-distribution model can be utilized for this purpose, such as a direct purchase model where programs (e.g., video games) are individually purchasable for download and execution on a client device 108, a subscription-based model, a content-distribution model where programs are rented or leased for a period of time, streamed, or otherwise made available to the client devices. Accordingly, an individual client device 108 may include one or more installed video games that are executable by loading the client application.

The client device 108 may be used to register with, and thereafter login to, a video game service. A user may create a user account for this purpose and specify/set credentials (e.g., passwords, PINs, biometric IDs, etc.) tied to the registered user account. As a plurality of users interact with the video game platform (e.g., by accessing their user/player profiles with a registered user account, playing video games on their respective client devices, etc.), the client devices send data to the remote computing system 104. The data sent to the remote computing system 104, for a given client device 108, may include, without limitation, user input data, video game data (e.g., game performance statistics uploaded to the remote system), social networking messages and related activity, identifiers (IDs) of the video games played on the client device 108, and so on. This data can be streamed in real-time (or substantially real-time), sent the remote system 104 at defined intervals, and/or uploaded in response to events (e.g., exiting a video game). As described in further detail below, this data may be used to determine a gameplay history of the user of the client device 108, which may be used for determining scores for determining notifications to present to the user 102(1) as part of a personalized game-notification feed.

FIG. 1, for instance, illustrates that the display device 110 coupled to the client device 108 may present a user interface (UI) 112 that includes a game-notification feed that has been personalized for the user 102(1). As illustrated, the UI 112 may present one or more game notifications 114(1), 114(2), . . . , 114(4). As introduced above, a game notification any information associated with the respective games, notifications generated by game curators or other user, and/or the like. For example, a notification may comprise any one or more of the following:

- an indication that a game update is available, such as a small update, a patch update, or a major update;
- an indication that additional game content is available, such as indication that a game is currently or about to be released, an indication of a future release date of the game, an invitation to participate in a beta version of the game or to learn about the beta version, an indication that downloadable (DLC) content has or will become available, or an indication of an upcoming season or battle pass release;
- an indication that a game discount or promotion is available, such as a limited-time discount on the game, a discount on in-game or DLC items, or a free trial associated with the game;
- an indication of an in-game event, such as time period in which a user will receive extra points (an "XP boost"), loot drops, bonuses or perks being offered, or a general in-game event;
- an indication of a game challenge or contest, such as a weekly or monthly challenge, a contest within a game, or the like;
- an indication of a live stream or broadcast of a game;
- an indication of a game announcement;
- an indication of a communication session associated with a game, such as a chat session;
- an indication of an in-person event associated with the game, such as an expo, meetup, or convention;
- an indication of promotion of a related game (e.g., a cross-promotion); or
- an indication of other type of news associated with the game.

In general, the remote system 104 may determine the notifications 114(1)-(4) to present as part of the notification feed based on information and/or behavior associated with the user 102(1) and/or the user community 102. In this regard, the remote system may comprise one or more processors 116 (e.g., central processing unit(s) (CPU(s)) and computer-readable media 118, as well as components stored thereon for generating personalized notification feeds for users. The computer-readable media 118 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 118 may be implemented as computer-readable storage media ("CRSM"), which may be any available physical media accessible by the processor(s) 116 to execute instructions stored on the computer-readable media 118. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information, which can be accessed by the processor(s) 116.

As illustrated, the computer-readable media 118 may store or otherwise have access to an acquisition component 120, a notification-generation component 122, a feed-generation component 124, and a user-interaction component 126. In addition, the computer-readable media 118 may store library data 128 indicating game titles previously acquired by different users of the user community 102 and information regarding users' gameplay (e.g., time played) of each of the games, list data 130 indicating lists of games (e.g., wish lists, etc.) associated with users of the user community 102, follow data 132 indicating games that different users of the user community 102 have requested to follow, and curator data 134 indicating game curators that different users of the user community 102 have requested to follow. In addition, the computer-readable media 118 may store notification data 136, which may be provided by game publishers in some instances, and feed data 138, which may store personalized notification feeds associated with users of the user community 102.

In general, the acquisition component 120 may enable users of the user community 102 to request to acquire (e.g., rent, purchase, etc.) games offered by the remote computing system 104. When a user, such as the user 102(1), acquires a game, the computing system 104 may store a corresponding indication in the library data 130. That is, the acquisition component 120 may store an indication that the user 102(1) has access to the play the acquired game.

The user-interaction component 126, meanwhile, may receive information associated with interactions between users of the user community 102 and the computing system 104 and may store this data for future use. For example, the user-interaction component 126 may store information regarding the games played by the user 102(1) and other users, an amount of time that the users play the game(s), feedback given by the users with respect to the games or game notifications, and/or the like. As introduced above and described below, this data may be used to generate personalized game-notification feeds for the users, such as the user 102(1).

The notification-generation component 122, meanwhile, may enable game publishers to generate the game notifications for presentation to the users of the user community. As stated above, the game publishers may provide any sort of notification data, which may be stored as notification data 136 and may be presented to the users as part of personalized notification feeds. In some instances, the notifications presented to each user may be selectable such that, when selected, the notifications provide additional information to the users. An example notification feed is discussed below with reference to FIGS. 2 and 3.

The feed-generation component 124 may use the data associated with the users of the user community 102 to determine which of the notifications to include in the personalized notification feeds, which may be stored as feed data 138. For example, the feed-generation component 124 may use data associated with the user 102(1) to generate the notification feed illustrated in the UI 112. In this example, the feed-generation component 124 may have determined to generate a personalized notification feed for the user 102(1) that includes at least the illustrated four game notifications 114(1)-(4).

To generate a personalized notification feed associated with a user, the feed-generation component 124 may first determine, from at least the library data 128, the list data 130, the follow data 132, and/or the curator data 134, a set of game titles associated with the user 102(1). The set of game titles may include those games that the user has previously acquired (e.g., owns or has rented) or has played as indicated by the library data 128, games that the user has added to a list of the user (e.g., a wish list of the user) as indicated by the list data 130, games that the user has requested to follow as indicated by the follow data 132, games that have been recommended by game curators that the user follows as indicated by the curator data 134, games that the remote computing system recommends for the user (e.g., as identified by a trained machine-learning model because they are related to games previously played by the user), and/or the like.

In some instances, the feed-generation component 124 may apply a weight to each respective game title included in the set of game titles. For example, the feed-generation component 124 may apply a time-decay model to each game title such that a game that a user has more recently played is weighted more heavily than a game that the user has not played for quite some time. In another example, a game that the user more recently purchased may be weighted more heavily than a game that the user purchased further back in time. In still another instance, a game that a user has followed more recently may be weighted more heavily than a game that the user followed longer ago. In yet another example, a weight may increase with the amount of time that the user has played a game, such that a heavily played game is weighted more heavily than a rarely played game. This may be determined either absolutely (e.g., in terms of time played) or relatively (e.g., in terms of time played relative to other users that have also played the game title or in terms of time played relative to the amount of time the same user has played other game titles). Of course, while the above describes an example manner of assigning weights to game titles, in other instances the weights may be applied in an opposite manner or in any other manner.

After determining the set of game titles associated with the user and, potentially, applying weights to these titles, the feed-generation component 124 may determine one or more notifications, from the notification data 136, associated with these game titles to present to the user 102(1). For example, for each game indicated in the set of game titles, the feed-generation component 124 may identify one or more game notifications for the respective game provided by the respective game publisher. Given that the number of notifications associated with this set of game titles may be relatively large, the feed-generation component 124 may apply a score to each notification for ranking these notifications relative to one another. After ranking the notifications, the feed-generation component 124 may generate and present, to the user 102(1), a notification feed that is ordered or otherwise presented based at least in part on this ranking.

For example, the feed-generation component 124 may apply a score to each notification based, at least in part, on the weight applied to the respective game title. For instance, if a game title is associated with a relatively high weight because the user plays the game fairly often, then one or more notifications associated with this game title may be assigned a higher weight and, thus, score than a notification associated with a game that the user 102(1) rarely plays.

In addition, or in the alternative, the score associated with each notification may be based, at least in part, on other information associated with the user 102(1) or based on information associated with one or more other users. For example, if the particular user has previously indicated a desire for a certain type of event, such as an indication of a game update, then the feed-generation component 124 may rank these types of notifications higher than notifications that the user has not previously expressed interest in (or types of notifications that the user has expressly indicated they do not prefer). In other instances, the feed-generation component 124 may assign a relatively higher score to notifications that users of the broader user community 102 often utilize. For example, if many users of a particular game (or many users in general) often watch live-streamed events, then notifications of these events may be assigned a higher score than other types of notifications.

In some instances, the feed-generation component 124 determines the scores for respective notifications based on explicit or implicit feedback provided the user 102(1) and/or by users 102 generally. For example, after providing a notification feed to a user, the user-interaction component 126 may determine which of the notifications the user 102(1) interacts with (e.g., selects, watches, reads, etc.), as well as which notifications the user 102(1) does not. In addition, the user-interaction component 126 may determine an amount of time that the user 102(1) consumes each respective notification. In some instances, the ratio between a number of times a particular type of notification is selected to a number of times that the remote computing system 104 presented the notification type to the user 102(1) (i.e., click-to-impression ratio) may be used in part to determine a score for subsequent notifications of that type. For example, if the user 102(1) often reads about game updates when they are presented to the user 102(1), this relatively high-ratio of selections to impressions may result in a relatively high score being assigned to subsequent game-update notifications. Conversely, if the user 102(1) rarely selects a notification associated with a game promotion, then the feed-generation component 124 may assign relatively lower scores to notifications associated with game promotions.

This may additionally, or alternatively, apply on a game-by-game basis. That is, if the user 102(1) often selects notifications associated with a first game, but rarely with a second game, then the feed-generation component 124 may assign a relatively high score to subsequent notifications associated with the first game (and, potentially, related games) and relatively lower scores to subsequent notifications associated with the second (and, potentially, related games). Further, while the above techniques have been described with reference to a particular user 102(1), the techniques may similarly or alternatively apply to the user community 102 in general. That is, if users of the user community 102 (e.g., a global community, a subset of the global community, etc.) often watch live-stream events when presented notifications about these events, then these types of notifications may be assigned a relatively high score for other users assigned in the community of the subset of the community.

After selecting the notifications to include in a personalized notification feed for a user, the feed-generation component 124 may generate the personalized notification feed comprising the selected notifications and may send the notification feed for output (e.g., display, audible output, etc.) on a client computing device associated with the user, such as for presentation on the display device 110. The personalized notification feed may be presented in a manner based at least in part on the respective scores of the corresponding notifications. For example, a highest scored/ranked notification may be presented first, followed by a second-highest scored/ranked notification, and so forth. In addition, or in the alternative, the personalized game-notification feed may present higher-ranked notifications more prominently (e.g., in a larger manner) than lesser-ranked notifications. As described below, each notification in the notification feed may be selectable by the user to view additional information with the notification. For example, selection of a particular notification may result in an expansion of the notification to present additional content associated with the notification, navigation to a new user interface associated with the notification, and/or the like.

As noted above, as the user 102(1) interacts with the notification feed, the feed-generation component 124 may use this feedback for re-calculating scores associated with the notifications for the user 102(1) and, potentially, generating an additional personalized game-notification feed for the user 102(1). In addition, or in the alternative, the user 102(1) may provide explicit feedback. For example, in some instances the notification feed includes one or more icons that are selectable by the user to provide the feedback, as described below with reference to FIG. 2.

In some instances, the feed-generation component 124 may use the received feedback to generate new scores and/or rankings and, thus, a new personalized notification feed in real-time or near-real-time. In other instances, the feed-generation component 124 may use the received feedback for generating a new personalized notification feed the next time that the user navigates to a location (e.g., webpage, portion of a client mobile application, etc.) on which the personalized notification feed is presented.

In some instances, the feed-generation component 124 may use the inputs described above, such as feedback of users, game-title sets, and the like, to train one or more machine-learning models for determining personalized notification feeds. For example, after such a model has been trained, the feed-generation component 124 may input data that is custom to a particular user such that the model outputs a ranked list of notifications for inclusion in the personalized notification feed.

Figure 2:
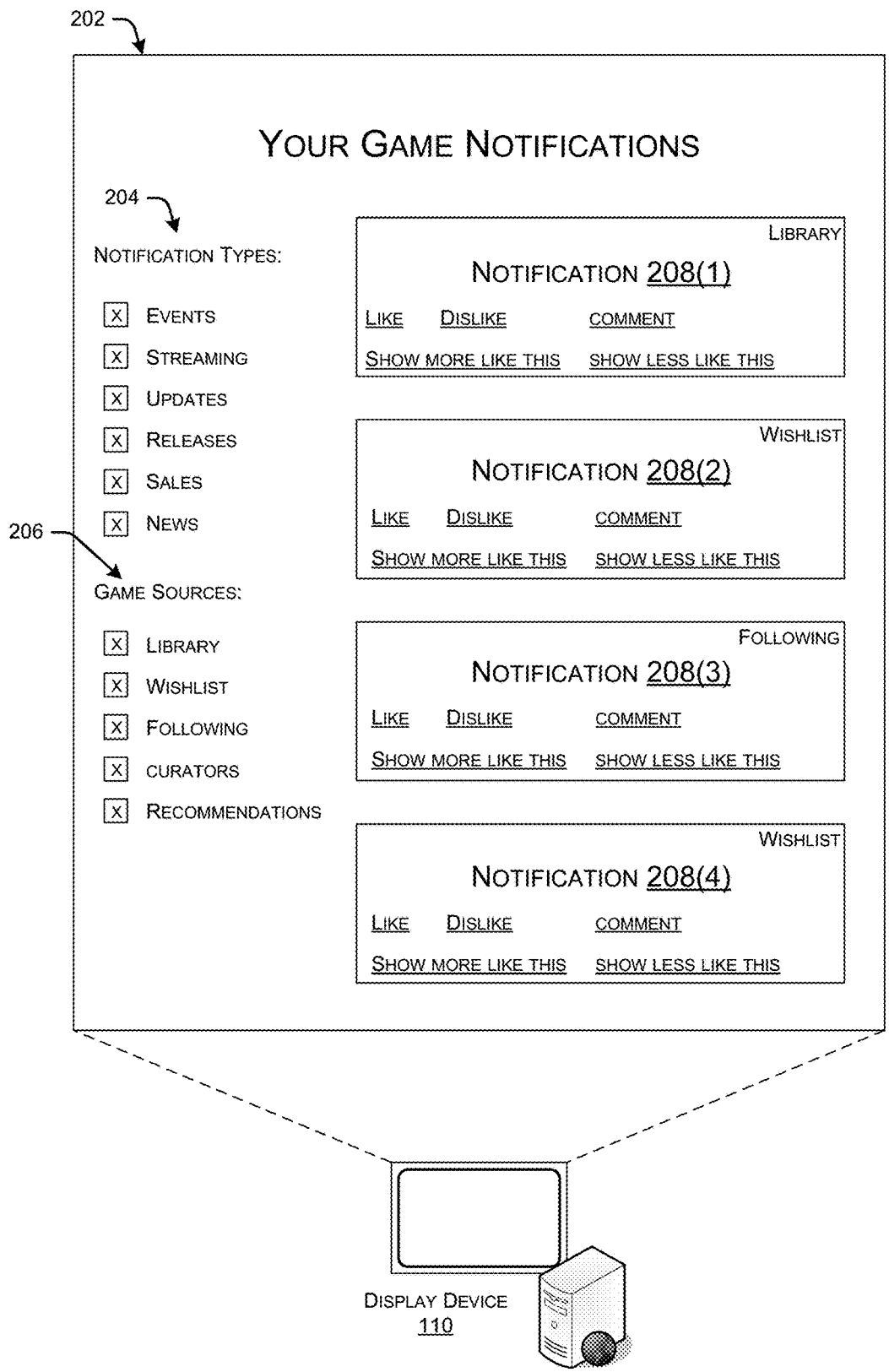
FIG. 2 illustrates an example user interface of a personalized notification feed that the remote computing system of FIG. 1 may provide to a client computing device. As illustrated, the notification feed may include an array of notifications that may have been selected for a user associated with the client computing device based on game titles associated with the user, preferences of the user (e.g., notification types preferred by the user), and the like. The user interface may also include icons to enable the user to select which types of notifications to include in the feed, as well as the game sources from which to generate the notifications.

FIG. 2 illustrates an example UI 202 of a personalized notification feed that the feed-generation component 124 may provide to the example client computing device 108 of the user 102(1). As illustrated, the notification feed may include an array of notifications 208(1), (2), . . . , (4) that may have been selected for the user 102(1) based on game titles associated with the user, preferences of the user 102(1) (e.g., notification types preferred by the user), and the like. As illustrated, each of the notifications 208 may include an indication of the source of the notification. For instance, each notification may indicate whether it is associated with a game that is in the library of the user, on the wish list of the user, followed by the user, recommended for the user, or the like. For instance, the first notification 208(1) indicates that it is associated with a game that is in a game library of the user 102(1), the second notification 208(2) indicates that it is associated with a game that is on a wish list of the user 102(1), and so forth. Further, and as noted above, in some instances the notifications may additionally, or alternatively, not be directly associated with a game, but may be generated by a game curator, a user in the user community 102, or the like.

FIG. 2 further illustrates that the UI 202 includes an indication 204 of the different notification types included in the notification feed. For example, the indication 204 illustrates that the notification feed includes event notifications, streaming notifications, game-update notifications, game-release notifications, sales notifications, and news notifications. Of course, while FIG. 2 illustrates several example types of notifications, it is to be appreciated that other embodiments may include more or fewer notification types. In addition, FIG. 2 illustrates that the UI 202 includes functionality for enabling the user 102(1) to select which notification types to view. For instance, the user 102(1) may request to view certain notification types, while not viewing others. While this example illustrates this functionality in terms of a checkbox, it is to be appreciated that other mechanisms (e.g., radio buttons, drop down menus, etc.) may be utilized.

FIG. 2 further illustrates that the UI 202 includes an indication 206 of the different game sources that are associated with the notifications included in the notification feed. For example, the indication 206 illustrates that the notification feed includes notifications that are associated with games in the library of the user 102(1), games on a wish list of the user 102(1), games being followed by the user 102(1), games recommended for the user 102(1) by the computing system 104, and games played or recommend by curators being followed by the user 102(1). Of course, while FIG. 2 illustrates several example types of game sources, it is to be appreciated that other embodiments may include more or fewer game sources and, further, the source of the notifications might not be directly related to a game, as in the case of curator-created or user-created notifications. In addition, FIG. 2 illustrates that the UI 202 includes functionality for enabling the user 102(1) to select which notifications to view based on game source. That is, the user 102(1) may request to view notifications that are associated with certain game sources (e.g., followed games), while not viewing notifications associated with others (e.g., games already in the user's library). Again, while this example illustrates this functionality in terms of a checkbox, it is to be appreciated that other mechanisms (e.g., radio buttons, drop down menus, etc.) may be utilized.

FIG. 2 further illustrates that each notification of the UI 202 may include functionality to enable the user to provide feedback on the notification. For example, each notification may include a first icon (e.g., "like") that is selectable to enable a user to indicate that the user enjoys this particular notification, a second icon (e.g., "dislike") that is selectable to enable a user to indicate that the user does not enjoy this particular notification, a third icon (e.g., "show more like this") that is selectable to enable a user to indicate that the user enjoys the type of notification, a fourth icon (e.g., "show less like this") that is selectable to enable a user to indicate that the user does not enjoy this particular type of notification, and a fifth icon (e.g., "comment) that is selectable to enable a user to view or express commentary on the notification. In some instances, and as discussed above, selection of these icons may be tracked by the user-interaction component 126 for generating feedback data, which may be used by the feed-generation component 124 for generating subsequent personalized notification feeds for the user.

Figure 3:
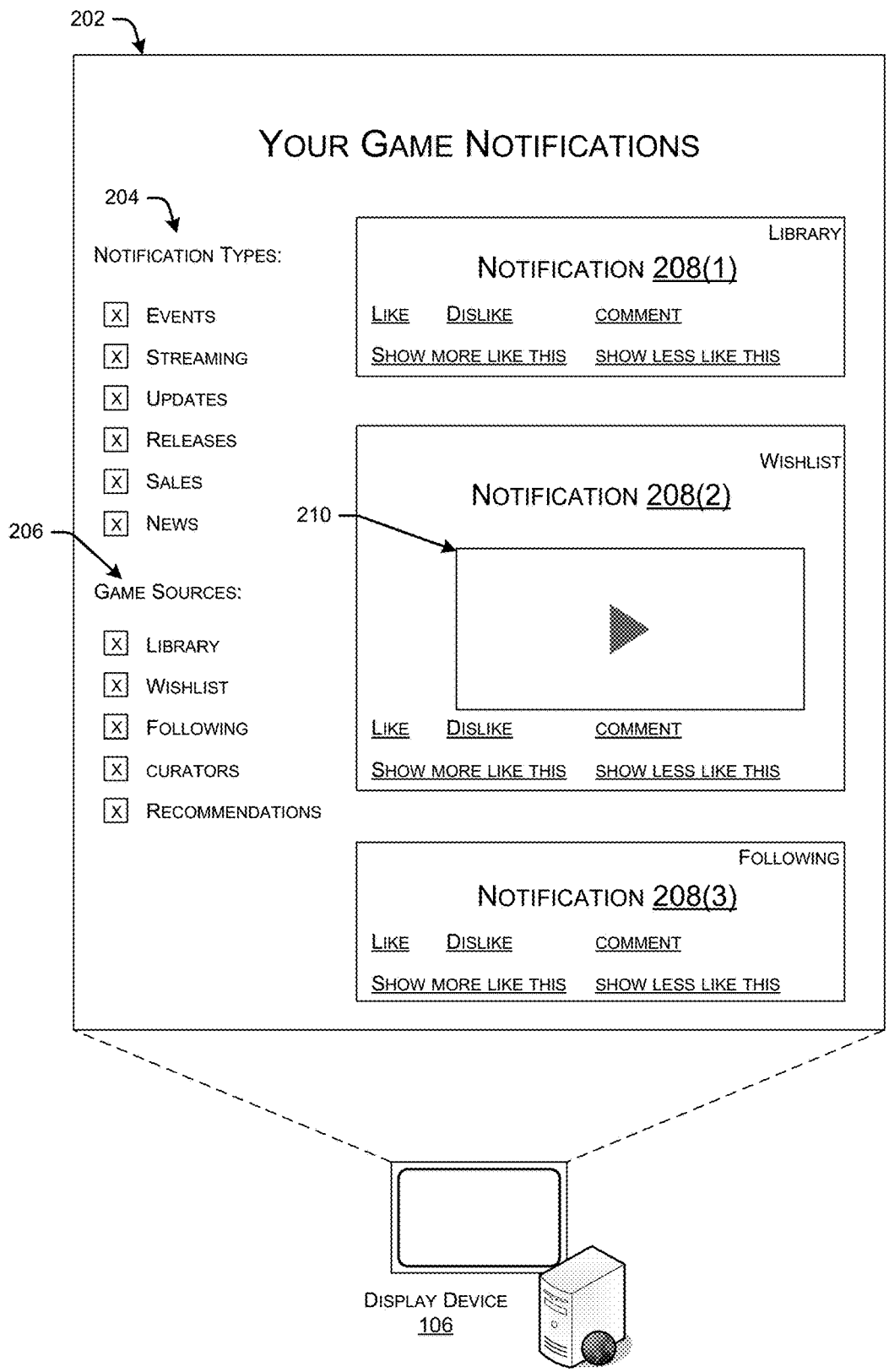
FIG. 3 illustrates the example user interface of FIG. 2 after the user has selected a notification from the notification feed. As illustrated, the user interface may display additional content in response to the selection. Further, the remote system may use the selection as feedback for generating subsequent notification feeds for the user and/or for other users.

FIG. 3 illustrates the example UI 202 after the user has selected the notification 208(2) from the notification feed. As illustrated, the user interface may display additional content 210 of the notification in response to the selection. In this example, the additional content 210 comprises a video, while in other instances the additional content 210 may comprise additional text, images, links, example gameplay, and/or any other content. Further, the user-interaction component 126 may store an indication of this selection as feedback data and the feed-generation component 124 may use the feedback data for generating subsequent notification feeds for the user and/or for other users. For example, the user-interaction component 126 may determine which notification the user selected and the amount of time that the user viewed the additional content, each of which may be used by the feed-generation component 124 for generating subsequent notification feeds for the user 102(1). In some instance, the greater the amount of time that the user views the additional content, the greater the weight applied to this notification, the notification type, the source of the notification, and so forth.

Figure 4:
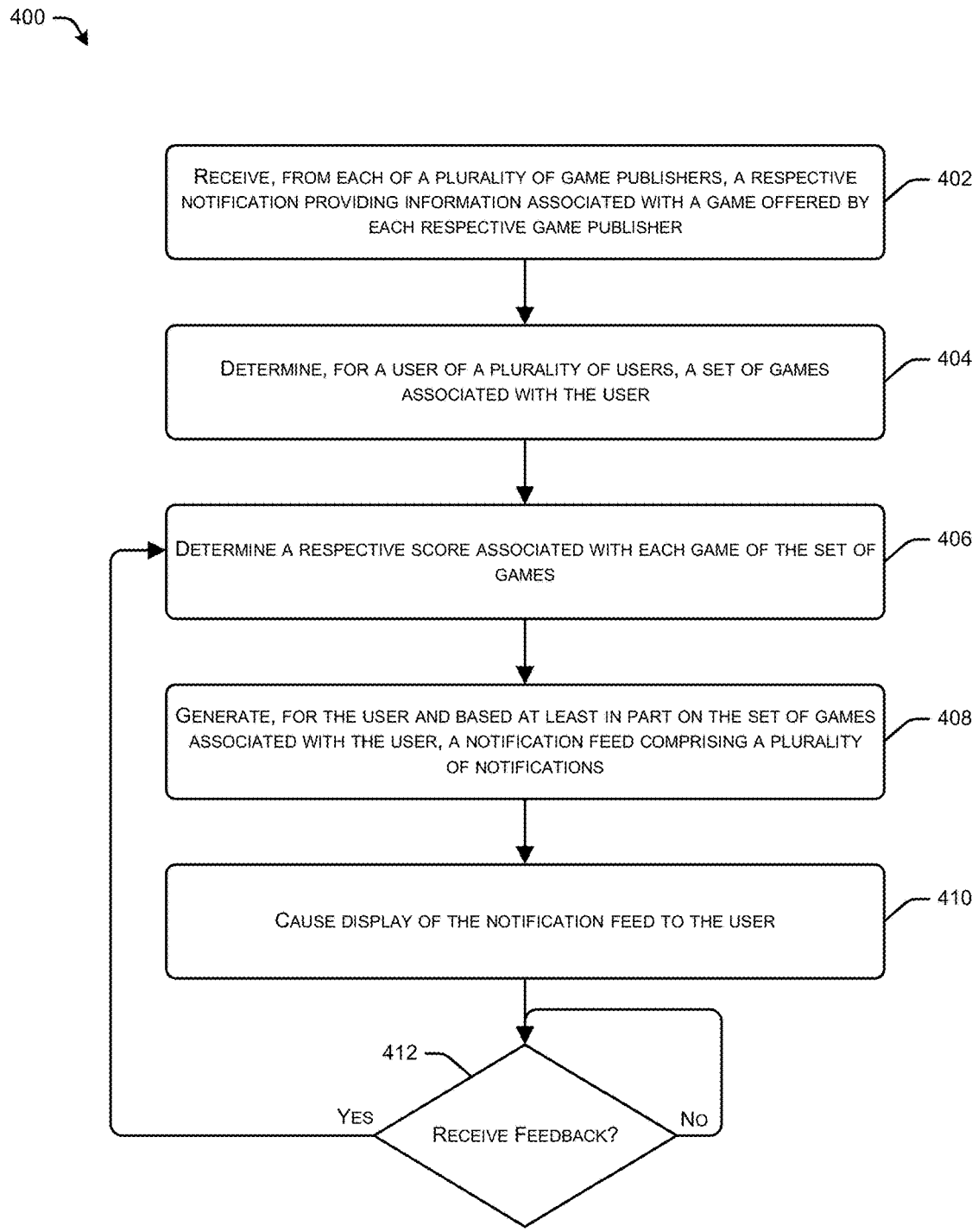
FIG. 4 illustrates a flow diagram of an example process for generating a personalized game-notification feed for a user, receiving feedback from the user or from other users and, in response, generating an updated personalized game-notification feed.

FIG. 4 illustrates a flow diagram of an example process 400 for generating a personalized game-notification feed for a user, receiving feedback from the user or from other users and, in response, generating an updated personalized game-notification feed. This process, and each process described herein, is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some instances, the computing system 104 may be configured to perform some or all of the operations, although in other instances other devices may additionally or alternatively perform some or all of the operations.

At an operation 402, the computing system 104 may receive, from each of a plurality of game publishers, a respective notification providing information associated with a game offered by each respective game publisher. As described above, each respective notification may comprise an indication that a game update is available, an indication that additional game content is available, an indication that a game discount or promotion is available, an indication of an in-game event, an indication of a game challenge or contest, an indication of a live stream or broadcast of a game, an indication of a game announcement, an indication of a communication session associated with a game, an indication of an in-person event associated with the game, or an indication of promotion of a related game.

At an operation 404, the computing system 104 may determine, for a user of a plurality of users, a set of games associated with the user. The set of games may include one or more games previously acquired by the user (as well as an amount of time played), one or more games that the user has previously added to a list associated with the user (as well as when the user added each game to the list), one or more games that the user has previously requested to receiving information about, one or more games recommended by a game curator followed by the user, and/or the like.

At an operation 406, the computing system 104 may determine a first respective score associated with each game of the set of games. As described above, this score may be based on prior interactions between the user (and/or other users) and the computing system 104. For example, the computing system 104 may determine which notification types the user typically responds to, which notification types the user typically ignores, and so forth. In some instances, a score may be higher for a notification if a ratio between an amount of time that the user selects the notification relative to the amount of time that the notification is presented to the user is relatively high, while a score may be lower for a notification if this ratio is relatively low.

At an operation 408, the computing system 104 may generate, for the user and based at least in part on the first score for each game of the set of games associated with the user, a first notification feed comprising a first plurality of notifications. At an operation 410, the computing system 104 may cause display of the first notification feed to the user. This may include presenting the notifications according to their ranking, with notifications having the relatively highest scores being presented first, in some instances.

At an operation 412, the computing system 104 determines whether feedback has been received from the user or from another user. If not, the user may continue to view the first notification feed. If feedback is received, however, the computing system 104 may calculate new scores for the notifications, given that the feedback may impact the score and, thus, the ranking of the notifications. If so, then the computing system 104 may generate a second notification feed and cause display of the second notification feed to the user. As noted above, the remote computing system may use the received feedback to generate new scores and/or rankings and, thus, a new personalized notification feed in real-time or near-real-time or may use this feedback to generate a new personalized notification feed the next time that the user navigates to a location (e.g., webpage, portion of a client mobile application, etc.) on which the personalized notification feed is presented.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method implemented at least in part by one or more processors of a computing system, the method comprising:
    receiving, from each of a plurality of game publishers, a respective notification providing information regarding a respective event associated with a game offered by each respective game publisher;
    determining, for a user of a plurality of users, a set of games associated with the user;
    generating, for the user and based at least in part on the set of games associated with the user, a first notification feed comprising a first plurality of notifications, wherein the first plurality of notifications are ordered at least in part based on an amount of time the user has played a respective game associated with a respective notification, and wherein the first plurality of notifications comprises:
    a first notification indicating at least one of that an update to a game or additional content of a game is available; and
    a second notification indicating at least one of that an in-game event, a livestream, or a broadcast of a game is available;
    causing display of the first notification feed to the user;
    receiving feedback from the user regarding at least one notification of the first plurality of notifications;
    receiving a selection of a notification type to exclude from a subsequent notification feed;
    receiving a selection of a game source of multiple game sources to exclude from the subsequent notification feed;
    generating, for the user and based at least in part on the set of games associated with the user, the feedback, the selection of the notification type to exclude, and the selection of the game source to exclude, a second notification feed comprising a second plurality of notifications, wherein the second plurality of notifications are ordered at least in part based on an amount of time the user has played a respective game associated with a respective notification, and wherein the second plurality of notifications are free from notifications of the notification type and from notifications generated based on the game source; and causing display of the second notification feed to the user.

2. The method as recited in claim 1, wherein the determining the set of games associated with the user comprises determining one or more games previously acquired by the user.

3. The method as recited in claim 1, wherein the determining the set of games associated with the user comprises determining one or more games that the user has previously added to a list associated with the user.

4. The method as recited in claim 3, further comprising determining, for each of the one or more games that the user has previously added to the list, a time at which the that the user added each respective game to the list, and wherein the generating each of the first notification feed and the second notification feed is further based at least in part on the time at which the that the user added each respective game to the list.

5. The method as recited in claim 1, wherein the determining the set of games associated with the user comprises determining one or more games for which the user has previously requested to receive information about.

6. The method as recited in claim 1, wherein the determining the set of games associated with the user comprises determining one or more games recommended by a game curator followed by the user.

7. The method as recited in claim 1, wherein the receiving the feedback from the user comprises receiving an indication of one or more notifications of the first notification feed that the user has selected.

8. The method as recited in claim 1, wherein the receiving the feedback from the user comprises receiving an indication of at least one notification of the first notification feed that the user has selected to view additional information about and an amount of time for which the user viewed the additional information.

9. The method as recited in claim 1, further comprising receiving additional feedback from an additional user regarding at least one notification, and wherein the generating of the second notification feed is further based at least in part on the additional feedback from the additional user.

10. The method as recited in claim 1, wherein the generating the first notification feed comprises determining a first order of the first plurality of notifications and the generating the second notification feed comprises determining a second order of the second plurality of notifications.

11. The method as recited in claim 1, further comprising:
determining a first respective score associated with each game of the set of games; and
determining a second respective score associated with each game of the set of games after the receiving of the feedback;
and wherein the generating of the first notification feed is based at least in part on the first respective scores and the generating of the second notification feed is based at least in part on the second respective scores.

12. The method as recited in claim 1, wherein the first plurality of notifications further comprises a third notification comprising at least one of an indication of a game discount or promotion, an indication of a game challenge or contest, an indication of a game announcement, an indication of a communication session associated with a game, an indication of an in-person event associated with the game, or an indication of promotion of a related game.

13. The method as recited in claim 1, wherein:
the causing display of the first notification feed to the user further comprises causing display of one or more icons for enabling the user to select which notification types of multiple notification types to display as part of the first notification feed, wherein the multiple notification types include at least a game update, additional content of a game, an in-game event, a livestream of a game, or a broadcast of a game; and
the receiving the selection of the notification type to exclude comprises receiving a selection at least one of the game update, the additional content of the game, the in-game event, the livestream of the game, or the broadcast of the game.

14. The method as recited in claim 1, wherein:
the determining the set of games comprises determining the set of games from the multiple game sources, each of the multiple game sources associated with one or more notifications of the first notification feed;
the causing display of the first notification feed to the user further comprises causing display of one or more icons for enabling the user to select which game sources of the multiple game sources to use to generate the first notification feed, wherein the multiple game sources include at least games from a library of the user, games from a wishlist of the user, games that the user is following, games associated with a curator followed by the user, or games that are recommended for the user; and
the receiving the selection of the game source to exclude comprises receiving a selection of at least one of the games from the library of the user, the games from the wishlist of the user, the games that the user is following, the games associated with the curator followed by the user, or the games that are recommended for the user.

15. A computing system comprising:
one or more processors; and
one or more computer-readable media storing computer-executable instructions that, when executed, cause the one or more processors to perform acts comprising:
receiving, from each of a plurality of game publishers, a respective notification providing information regarding a respective event associated with a game offered by each respective game publisher;
determining, for a user of a plurality of users, a set of games associated with the user;
generating, for the user and based at least in part on the set of games associated with the user, a first notification feed comprising a first plurality of notifications, wherein the first plurality of notifications are ordered at least in part based on an amount of time the user has played a respective game associated with a respective notification, and wherein the first plurality of notifications comprises:
a first notification indicating at least one of that an update to a game or additional content of a game is available; and
a second notification indicating at least one of that an in-game event, a livestream, or a broadcast of a game is available;

causing display of the first notification feed to the user;

receiving feedback from the user regarding at least one notification of the first plurality of notifications;

receiving a selection of a notification type to exclude from a subsequent notification feed;

receiving a selection of a game source of multiple game sources to exclude from the subsequent notification feed;

generating, for the user and based at least in part on the set of games associated with the user, the feedback, the selection of the notification type to exclude, and the selection of the game source to exclude, a second notification feed comprising a second plurality of notifications, wherein the second plurality of notifications are ordered at least in part based on an amount of time the user has played a respective game associated with a respective notification, and wherein the second plurality of notifications are free from notifications of the notification type and from notifications generated based on the game source; and causing display of the second notification feed to the user.

16. The computing system as recited in claim 15, wherein the determining the set of games associated with the user comprises at least one of determining one or more games previously acquired by the user;

determining one or more games that the user has previously added to a list associated with the user;

determining one or more games that the user has previously requested to receive information about; or determining one or more games recommended by a game curator followed by the user.

17. The computing system as recited in claim 15, wherein:

the determining the set of games comprises determining the set of games from multiple game sources, each of the multiple game sources associated with one or more notifications of the first notification feed; and the causing display of the first notification feed to the user further comprises causing display of one or more first icons for enabling the user to select which type of notification to display as part of the first notification feed and one or more second icons for enabling the user to select which game sources of the multiple game sources to use to generate the first notification feed.

18. One or more non-transitory computer-readable media storing computer-executable instructions that, when executed, cause one or more processors to perform acts comprising:

receiving, from each of a plurality of game publishers, a respective notification providing information regarding a respective event associated with a game offered by each respective game publisher;

determining, for a user of a plurality of users, a set of games associated with the user;

generating, for the user and based at least in part on the set of games associated with the user, a first notification feed comprising a first plurality of notifications, wherein the first plurality of notifications are ordered at least in part based on an amount of time the user has played a respective game associated with a respective notification, and wherein the first plurality of notifications comprises:

a first notification indicating at least one of that an update to a game or additional content of a game is available; and a second notification indicating at least one of that an in-game event, a livestream, or a broadcast of a game is available;

causing display of the first notification feed to the user;

receiving feedback from the user regarding at least one notification of the first plurality of notifications;

receiving a selection of a notification type to exclude from a subsequent notification feed;

receiving a selection of a game source of multiple game sources to exclude from the subsequent notification feed;

generating, for the user and based at least in part on the set of games associated with the user, the feedback, the selection of the notification type to exclude, and the selection of the game source to exclude, a second notification feed comprising a second plurality of notifications, wherein the second plurality of notifications are ordered at least in part based on an amount of time the user has played a respective game associated with a respective notification, and wherein the second plurality of notifications are free from notifications of the notification type and from notifications generated based on the game source; and causing display of the second notification feed to the user.

19. The one or more non-transitory computer-readable media as recited in claim 18, wherein the determining the set of games associated with the user comprises at least one of:

determining one or more games previously acquired by the user;

determining one or more games that the user has previously added to a list associated with the user;

determining one or more games that the user has previously requested to receive information about; or determining one or more games recommended by a game curator followed by the user.

\* \* \* \* \*